C. WADSWORTH.
Fruit-Gatherer.

No. 68,399.　　　　　　　　　　　　　　Patented Sept. 3, 1867.

Witnesses:
J. F. Single
H. M. Wadsworth

Inventor:
Calvin Wadsworth

United States Patent Office.

CALVIN WADSWORTH, OF MADISON, OHIO.

Letters Patent No. 68,399, dated September 3, 1867.

IMPROVEMENT IN SELF-RELIEVING GRAPE-GATHERER.

*The Schedule referred to in these Letters Patent and making part of the same.*

---

TO ALL WHOM IT MAY CONCERN:

Be it known that I, CALVIN WADSWORTH, of Madison, in the county of Lake, and State of Ohio, have invented a new article of manufacture for use in gathering fruits, especially adapted for grapes and the tender varieties of peaches, which article I denominate a "Self-Relieving Grape-Gatherer;" and I do hereby declare that the following is a full and exact description thereof, reference being had to the accompanying drawings, in which—

Figure 1:
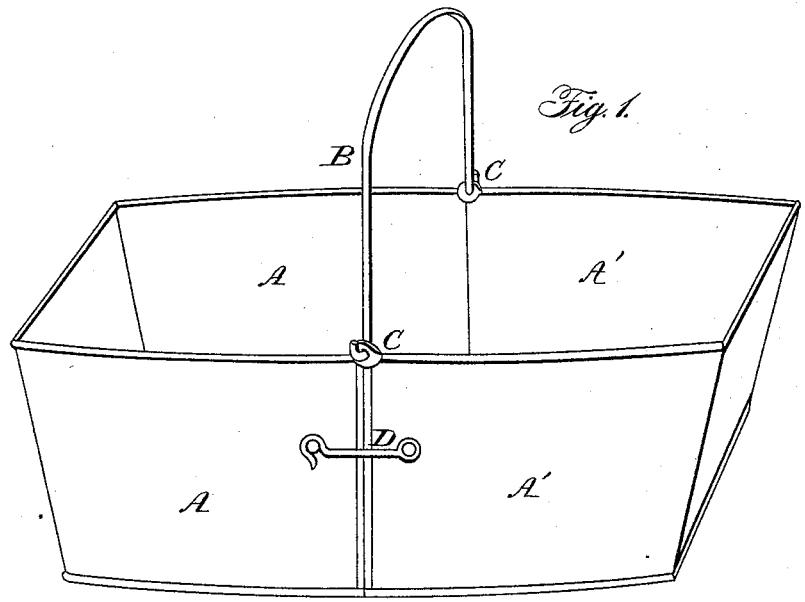

Figure 1 is a view in perspective of the same, and

Figure 2:
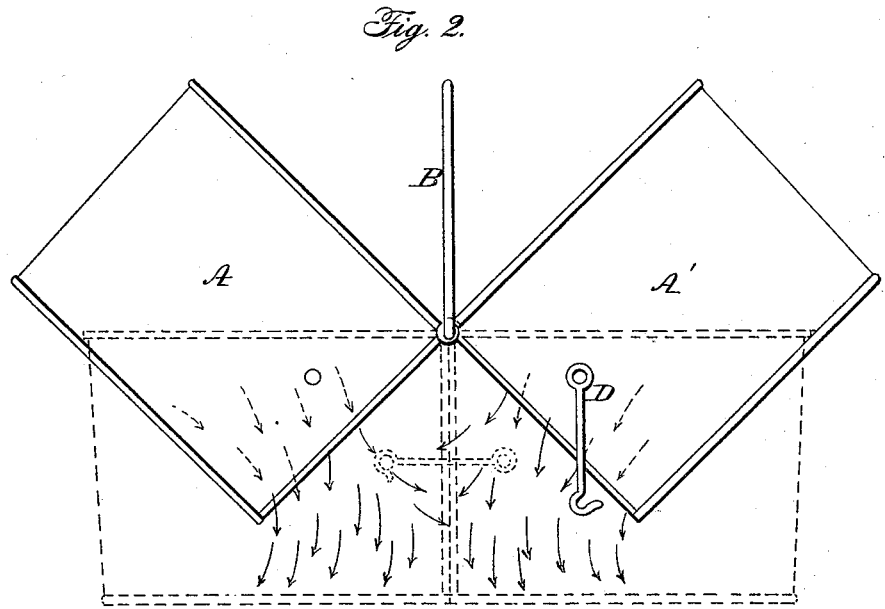

Figure 2 a side elevation thereof, showing the way in which it is operated to discharge the fruit, as will be hereafter explained.

The letters of reference marked thereon indicate similar parts in both figures.

This invention relates to a basket or receptacle constructed in halves, and is so arranged that it can be opened at the bottom and sides centrally to deposit the contents. It is intended for receiving fruit as it is gathered from the trees or vines, and will empty with more expedition and ease, and with less damage to the fruit, than is accomplished by the ordinary mode. Its principal use is in the gathering of grapes intended for boxing and transportation. It will not only obviate the necessity of handling them bunch by bunch from the basket, but saves the time thus occupied, and prevents much of the bruising caused by the handling, by allowing them to drop from the basket gently and in a body on the shelves or benches on which they are usually spread before boxing or final removal. All tender and choice fruits are by this invention subjected to as little handling as possible.

The following is a description of the construction and operation of my said invention:

A A', fig. 1, represent two separate divisions, which constitute the basket. They can be made of any material that will answer the purpose. The said divisions are attached together on the upper edges by the ends of the handle B passing through eyes C, formed at the joinings, as seen, and are confined, for the purpose of filling, by the hasp D. The handle can be confined in place by turning up the ends.

Fig. 2 explains the operation. It will be seen that in order to empty the contents of the basket the hasp is unfastened and the halves A A' opened by the operator applying a hand to each of the said halves, which allows the grapes to fall easily and gently on the shelf or board provided to receive them. When the contents are deposited the halves are again closed and secured by the hasp for another filling.

What I claim as my invention, and desire to secure by Letters Patent, is—

I claim, as a new article of manufacture, the divided basket or receptacle herein described, consisting of the hinged halves A A' and hasp D, arranged so as to operate in the manner and for the purposes specified.

CALVIN WADSWORTH.

Witnesses:
J. F. SINGLE,
M. S. HARVEY.